United States Patent [19]

Motomura et al.

[11] Patent Number: 5,104,205
[45] Date of Patent: Apr. 14, 1992

[54] TRACK GUIDING GUARD

[75] Inventors: Hidetake Motomura; Masashi Musha, both of Hyogo, Japan

[73] Assignee: Shin Caterpillar Mitsubishi Ltd., Tokyo, Japan

[21] Appl. No.: 562,122

[22] Filed: Aug. 3, 1990

[30] Foreign Application Priority Data

Aug. 23, 1989 [JP] Japan ................ 1-98289[U]

[51] Int. Cl.$^5$ .......................................... B62D 55/088
[52] U.S. Cl. ........................................ 305/12; 305/27; 305/16; 180/6.7; 180/8.7; 180/9.1
[58] Field of Search ................ 305/12, 16, 17, 18, 305/21, 24, 60, 28, 27; 180/6.7, 8.7, 9.1

[56] References Cited

U.S. PATENT DOCUMENTS

| | | | |
|---|---|---|---|
| 2,418,610 | 4/1947 | Webb | 305/12 X |
| 4,097,093 | 6/1978 | Shelby et al. | 305/22 |
| 4,229,053 | 10/1980 | Cline | 305/12 X |

FOREIGN PATENT DOCUMENTS

| | | | |
|---|---|---|---|
| 524126 | 8/1952 | Canada | 305/17 |
| 742882 | 10/1943 | Fed. Rep. of Germany | 305/18 |
| 55-171684 | 12/1980 | Japan . | |
| 57-39884 | 3/1982 | Japan . | |
| 58-92182 | 6/1983 | Japan . | |

*Primary Examiner*—Russell D. Stormer
*Attorney, Agent, or Firm*—Fish and Richardson

[57] ABSTRACT

A track guiding guard for a crawler type vehicle which is mounted along the lower side of a track frame is disclosed. The track guiding guard comprises a pair of left and right guard members which rotatably support track rollers. Each guard member has a slanted bottom surface which defines a limit angle of inclination between the same and the upper surfaces of track shoes that face the bottom surface, the angle diverging laterally outward. Each guard member further defines a predetermined gap between the inner side surface of the lower end thereof and the outer ends of track pins that face the inner side surface. The gap is so set that when the bottom surface of the guard member is seated on the upper surfaces of the track shoes, the inner side surface of the lower end of the guard member substantially comes into contact with the outer ends of the track pins. Thus, the inclination of the vehicle is stably supported by the seating of the bottom surface of the guard member on the upper surfaces of the track shoes and the contact between the inner surface of the lower end of the guard member and the outer ends of the track pins.

11 Claims, 3 Drawing Sheets

TRACK GUIDING GUARD

BACKGROUND OF THE INVENTION

1. Field of the Invention

The present invention relates to the structure of a track guiding guard which is designed to protect track rollers of a crawler or track type vehicle.

2. Description of the Prior Art

A typical conventional track guiding guard for protecting track rollers of a crawler type vehicle includes, as shown in FIGS. 3 and 4, a pair of long left and right guard members 5 which rotatably support track rollers 3 under a track frame 1, the track rollers 3 being properly spaced apart from each other in the longitudinal direction. The track rollers 3 guide track links 9 which are secured to the upper surface of each track shoe 7 and engaged with the track rollers 3. Each guard member 5 includes a side plate 11 of continuous length which rotatably supports one end of each track roller 3, U-shaped brackets 13 which are secured to the side plate 11, and an upper plate 15 and a guide 17 which are of continuous length and are secured to the upper and lower ends, respectively, of the side plate 11 and all of them are secured together in one unit. The upper plate 15 is secured to the lower end of the track frame 1 by means, for example, of bolts 19.

The track guiding guard 10 having the arrangement described above is, when the vehicle travels on a flat land, in the state shown in FIG. 4. However, when the vehicle moves over irregular land or works on a slope, the track frames 1 are inclined relative to the track shoes 7 which are left in close contact with the ground, as shown in FIG. 5. As a result, the track rollers 3 are subjected to a force which acts in such a manner as to lift them upwardly at one end thereof and thereby tend to disengage them from the track links 9. At this point, the guide 17 at the lower end of the one guard member 5 abuts against the outer ends of track pins 21, thereby limiting the inclination, and thus preventing the track rollers 3 from disengaging from the track links 9.

In the above-described prior art, however, if the limit angle $\theta$ of inclination of the vehicle body relative to the track shoes 7 or the track links 9 is set at an excessively small angle, when the vehicle moves over irregular land, bumps are likely to be transmitted from the track shoes 7 to the vehicle body, thus causing discomfort to the driver. On the other hand, if the limit angle $\theta$ of inclination is set at an excessively large angle, the moment about the mounting bolts 19 that is caused by a force acting on the guide 17 from track pins at the lower end of the guard member 5 is too large and it is therefore likely that the guard member 5 or the mounting bolts 19 will be broken. If the angle $\theta$ of inclination exceeds the critical angle of slip between the track rollers 3 and the track links 9, the track links 9 disengage from the track rollers 3, as shown in FIG. 6, which accelerate the nonuniform or local wear of the track rollers 3 and the track links 9. Further, since the horizontal distance l between supporting points P1 and P2 where moment is born when the vehicle body is inclined is short, the prior art has inferior stability.

SUMMARY OF THE INVENTION

The present invention aims at eliminating the above-described disadvantages of the prior art and provides a track guiding guard which is mounted along the lower side of a track frame, comprising a pair of left and right guard members which rotatably support track rollers, each guard member having a slanted bottom surface which defines a limit angle of inclination between the same and the upper surfaces of track shoes that face the bottom surface, the angle diverging laterally outward, each guard member further defining a predetermined gap between the inner side surface of the lower end thereof and the outer ends of track pins that face it, the gap being so set that when the bottom surface of the guard member is seated on the upper surfaces of the track shoes, the inner side surface of the lower end of the guard member substantially comes into contact with the outer ends of the track pins.

Since the arrangement of the invention is made as stated above, the angle of inclination of the vehicle body relative to the track shoes is limited by both the seating of the bottom surface of the guard member on the upper surfaces of the track shoes and the contact between the inner side surface of the lower end of the guard member and the outer ends of the track pins. It is therefore possible to minimize the moment about the mounting bolts that acts on the guard member when the vehicle body is inclined relative to the track shoes, and hence possible to prevent deformation of the guard member and consequent breakage of the mounting bolts. Accordingly, the limit angle of inclination of the vehicle body relative to the track shoes can be set at a relatively large angle, which makes the vehicle relatively comfortable to ride in. Further, since the contact between the track shoes and the bottom surface of the guard member is not point contact but plane contact, the resulting frictional force therebetween is sufficiently large to prevent the track rollers from sliding in the direction of thrust, and it is therefore unlikely that the track rollers will disengage from the track links. In addition, the bottom surface of the guard member is in plane contact with the track shoes, and the moment of inclination is born with a relatively long distance between the supports, that is, the point of contact between the track links and the track rollers and the point of contact between the track shoes and the bottom surface of the guard member. There is therefore no fear that the vehicle body will be inclined in excess of the limit angle. Thus, the track guiding guard of the present invention provides superior stability.

The above and other objects, features and advantages of the present invention will become more apparent from the following description when taken in conjunction with the accompanying drawings in which a preferred embodiment of the present invention is shown by way of illustrative examples.

DETAILED DESCRIPTION OF THE PREFERRED EMBODIMENT

One preferred embodiment of the present invention will be described below with reference to the accompanying drawings.

Figure 1:
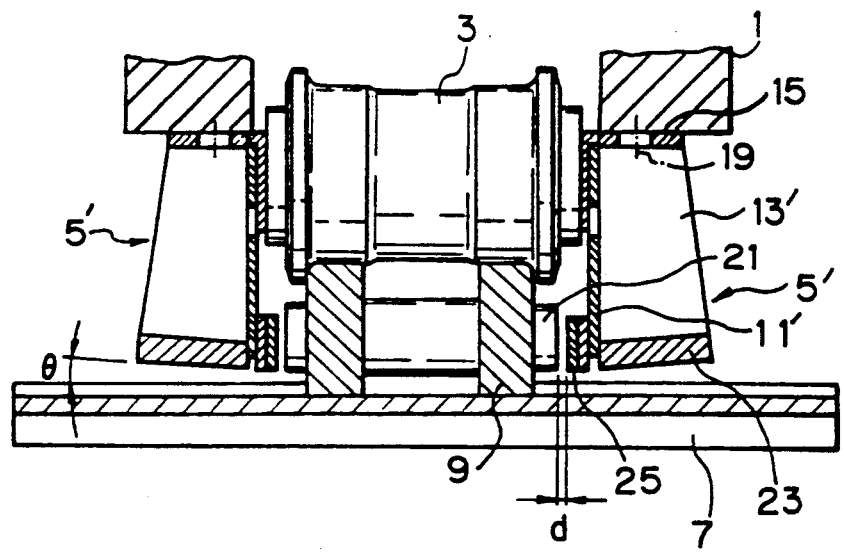
FIG. 1 is a transverse sectional view of one embodiment of the present invention in an operation on a level ground.
Figure 2:
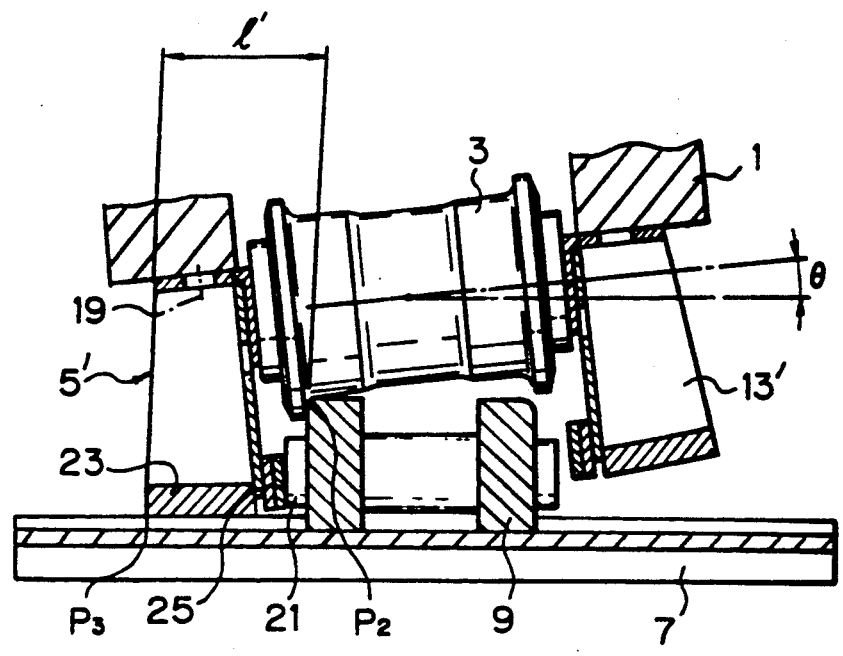
FIG. 2 is a transverse sectional view of the embodiment in an operation on a slope.

FIGS. 1 and 2 show in combination one embodiment of the present invention. In these figures, the same reference numerals as those in FIGS. 3 to 6 denote the same elements.

In particular, left and right guard members 5' rotatably support track rollers 3 under a track frame 1. The track rollers 3 guide track links 9 which are secured to the upper surface of each track shoe 7 and engaged with track rollers 3. Each guard member 5' includes a side plate 11', brackets 13' and an upper plate 15 secured to the lower end of the track frame 1 by means, for example, of bolts 19.

Figure 3:
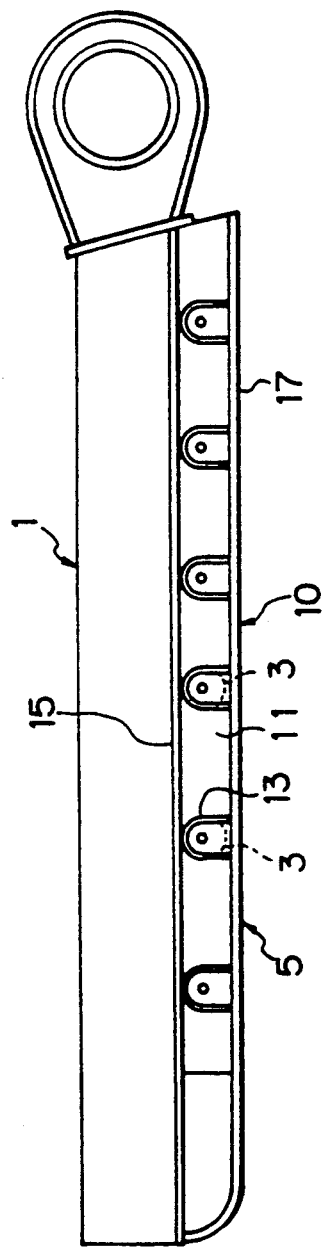
FIG. 3 is a side view showing one example of conventional track guiding guards, together with a track frame associated therewith.
Figure 4:
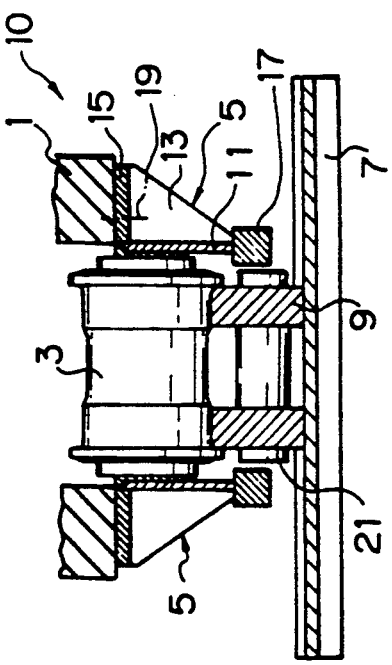
FIG. 4 is a transverse sectional view of the conventional track guiding guard in an operation on a flat land.
Figure 5:
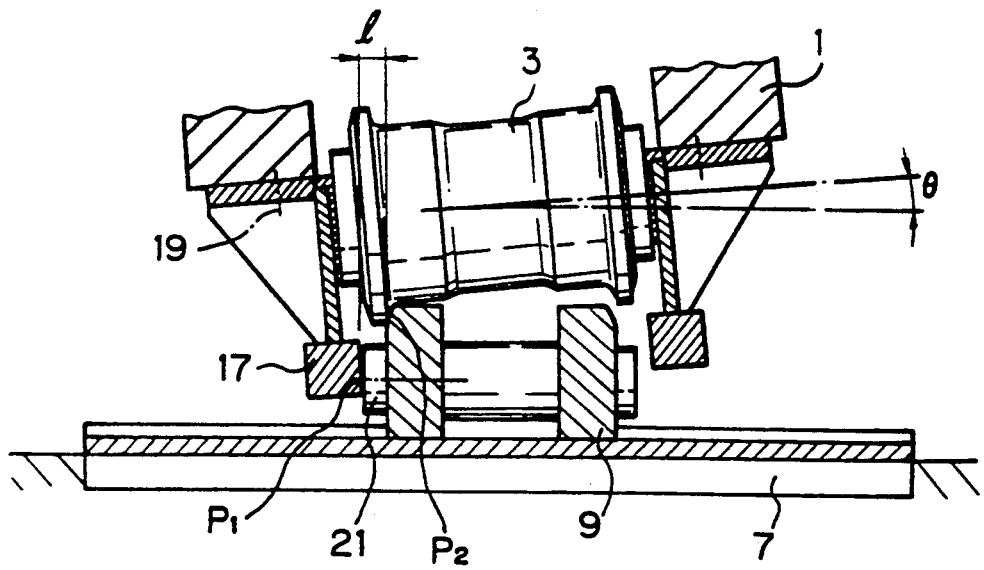
FIG. 5 is a transverse sectional view of the conventional track guiding guard in an operation on a slope.
Figure 6:
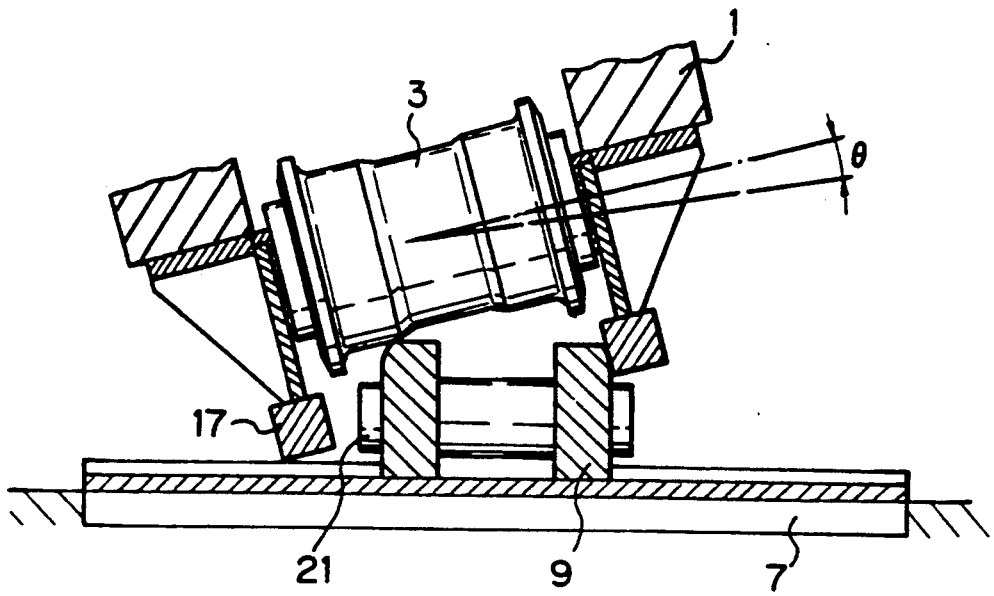
FIG. 6 is a transverse sectional view of the conventional track guiding guard when disengaged from the associated track links.

In the illustrated embodiment, each guard member 5' of the track guiding guard has a plurality of U-shaped brackets 13' spaced apart from each other in the longitudinal direction as like in the conventional guard member shown in FIG. 3. Each of the bracket 13' is gradually increased in width laterally outward toward the lower end thereof, and a common bottom plate 23 which has a relatively large width is secured to the lower ends of the U-shaped brackets 13' in the longitudinal direction of the track guiding guard. The lower surface of the bottom plate 23 is slanted relative to the upper surfaces of the track shoes 7 so as to define a limit angle θ of inclination therebetween which diverges laterally outward. An abutting plate 25 which extends longitudinally along the track guiding guard is secured to the inner side of the lower end portion of each side plate 11' with a slight gap d provided between the abutting plate 25 and the outer end of a track pins 21. The gap d between the abutting plate 25 and the outer ends of the track pins 21 is set in such a manner that when the vehicle body is inclined relative to the track shoes 7 and the bottom plate 23 of the track guiding guard is seated on the upper surfaces of the track shoes 7, the abutting plate 25 abuts against the outer ends of the track pins 21 that face it, as shown in FIG. 2.

In operation, when the vehicle is running or working on a level ground, the track guiding guard 5' having the described structure is in the state shown in FIG. 1, whereas when the vehicle is running or working on irregular ground or a slope, the vehicle body is inclined relative to the track shoes 7, so that the the bottom plate 23 of the track guiding guard is seated on the upper surfaces of the track shoes 7 and, at the same time, the abutting plate 25 that is secured to the inner side of the lower end portion of the guard member 5' abuts against the outer ends of the track pins 21 that face it, as shown in FIG. 2, thereby limiting the angle θ of inclination. At this time, the moment of inclination is born by relatively long support distance l', i.e., by means of the contact between the track shoes 7 and the bottom plate 23 of the track guiding guard and the contact between the abutting plate 25 and the outer ends of the track pins 21. Accordingly, the moment about the mounting bolts 19 that acts on the guard member 5' is relatively small, so that it is possible to prevent deformation of the guard member 5' and consequent breakage of the bolts 19. It is therefore possible to make the limit angle θ of inclination relatively large and hence make the vehicle relatively comfortable to ride in. Further, since the contact between the bottom plate 23 of the track guiding guard and the upper surfaces of the track shoes 7 is not point contact but plane contact, the resulting frictional force therebetween is sufficiently large to prevent the track rollers 3 from sliding in the direction of thrust, and it is therefore unlikely that the track rollers 3 will disengage from the track links 9. In addition, since the bottom plate 23 of the track guiding guard is in plane contact with the track shoes 7, as described above, and the moment of inclination is born with a relatively long distance l' between the supports, that is, the point P2 of contact between the track links 9 and the track rollers 3 and the point P3 of contact between the track shoes 7 and the bottom plate 23, as illustrated, there is no possibility that the vehicle body will be inclined in excess of the limit angle. Thus, the track guiding guard of the present invention provides superior stability.

Although in the foregoing embodiment the U-shaped bracket 13' is gradually enlarged in width toward the lower end, it is not always necessary to enlarge the width of the bracket 13' toward the lower end and it is possible to use the bracket having a fixed width toward the lower end. In addition, it is not always necessary to provide the abutting plate 25 on the inner side of the side plate 11', and the abutting plate 25 may be replaced by a ridge which is formed integral with the inner side of the side plate 11'.

As stated above, it is possible according to the present invention to provide a track guiding guard which prevents deformation of the guard member or breakage of the mounting bolts and prevents the track rollers from disengaging from the track links, provides superior stability and enables the driver to enjoy a relatively comfortable ride.

What is claimed is:

1. A track guiding guard for a crawler type vehicle which is mounted along the lower side of a track frame of the vehicle and comprises a pair of left and right guard members which rotatably support track rollers, said track guiding guard is characterized in that each of said guard members having a slanted bottom surface defining a limit angle of inclination between the same and the upper surfaces of track shoes that face said bottom surface, said angle diverging laterally outward, each guard member further defining a predetermined gap between the inner side surface of the lower end thereof and the outer ends of track pins that face it, said gap being so set that when the bottom surface of said guard member is seated on the upper surfaces of said track shoes, the inner side surface of the lower end of said guard member substantially comes into contact with the outer ends of said track pins.

2. A track guiding guard according to claim 1, wherein each of said guard members is gradually enlarged in width laterally outward or having a fixed width toward the lower end thereof.

3. A track guiding guard according to claim 1 or 2, wherein a bottom plate is secured to the lower end of each of said guard members.

4. A track guiding guard according to claim 3, wherein an abutting plate is secured to the inner side surface of the lower end of each of said guard members.

5. A track guiding guard according to claim 3, wherein a ridge is formed integrally with an inner side surface of the lower end of each of said guard members.

6. A track guiding guard according to claim 1, wherein each of said guard members includes a side plate of continuous length, a plurality of U-shaped brackets spaced apart from each other in the longitudinal direction and secured to said side plate, an upper plate and a bottom plate secured to the upper and lower ends respectively of said side plate, a bottom surface of said bottom plate defining said bottom surface of said guard member, and an inner surface of said side plate defining said inner side surface of said guard member.

7. A track guiding guard according to claim 6, wherein each of said U-shaped brackets is gradually enlarged in width laterally outward or having a fixed width toward the lower end thereof.

8. A track guiding guard according to claim 6 or 7, wherein an abutting plate is secured to said inner surface of each of said side palte at the lower end thereof.

9. A track guiding guard according to claim 6 or 7, wherein a ridge is formed integrally with the inner side surface of the lower end of said side plate.

10. A track guiding guard according to claim 1 or 2, wherein an abutting plate is secured to the inner side surface of the lower end of each of said guard members.

11. A track guiding guard according to claim 1 or 2, wherein a ridge is formed integrally with an inner side surface of the lower end of each of said guard members.

* * * * *